United States Patent [19]
Lake, Jr. et al.

[11] 3,785,231
[45] Jan. 15, 1974

[54] APPARATUS FOR CUTTING BLANKS

[75] Inventors: Willett R. Lake, Jr.; James O. Ward, both of Portland, Oreg.

[73] Assignee: Pak-Well Corporation, Denver, Colo.

[22] Filed: Aug. 18, 1972

[21] Appl. No.: 281,836

[52] U.S. Cl.............................. 83/103, 83/36, 83/50, 83/157
[51] Int. Cl........................... B26d 3/00, B26d 7/06
[58] Field of Search...................... 83/103, 104, 157, 83/102, 36, 50

[56] References Cited
UNITED STATES PATENTS

| | | | |
|---|---|---|---|
| 1,596,512 | 8/1926 | Pritner et al............................ | 83/36 |
| 2,822,004 | 2/1958 | Rudolph ............................ | 83/425.2 |
| 3,129,622 | 4/1964 | Pearce .................................. | 83/36 |
| 3,391,590 | 7/1968 | Stein.................................. | 83/103 |

*Primary Examiner*—Willie G. Abercrombie
*Attorney*—Kolisch, Hartwell & Dickinson

[57] ABSTRACT

Apparatus for cutting blanks from a sheet. A method of cutting such blanks using a cutting table and cutting die which are relatively movable to position the die over different regions of a sheet to ready the die for cutting. The apparatus specifically disclosed comprises a die press having a vertically movable cutting die which is forced downwardly to cut a blank. A horizontally disposed cutting table below the die is movable in increments along a horizontal path between retracted and extended positions, to advance sheets supported on the table to different positions under the die. A sheet is supplied to the cutting table from a support table disposed at one end of the cutting table with the latter in its retracted position. Sheets are deposited on such support table from a supply. Sheets moved off the cutting table move over a drop table and thence onto an ejector table, such tables being aligned in a direction extending transversely of the path of movement of the cutting table. Clamps on the cutting table hold a side margin of a sheet, with the sheet edge bounding such side margin positioned parallel to the path of movement of the cutting table and remote from the side of the cutting table which is adjacent the drop table. Using the method of the invention, these clamps are released in succession, and the cutting of blanks is performed using a last sequence of cuts which occurs along the side margin of the sheet held by the clamps.

6 Claims, 5 Drawing Figures

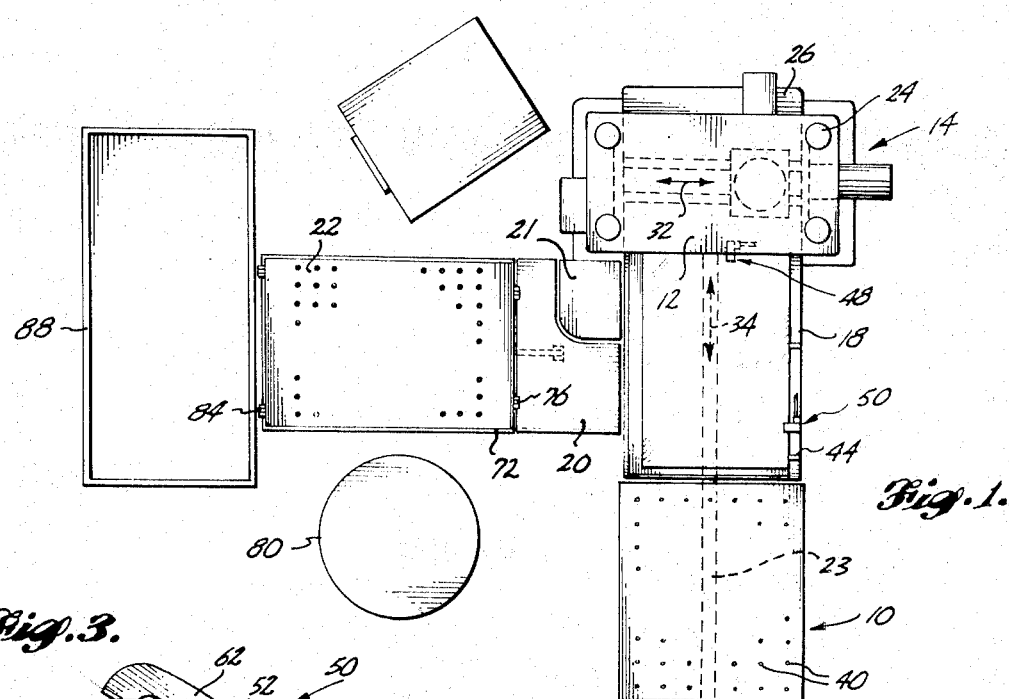
Fig.1.
Fig.3.
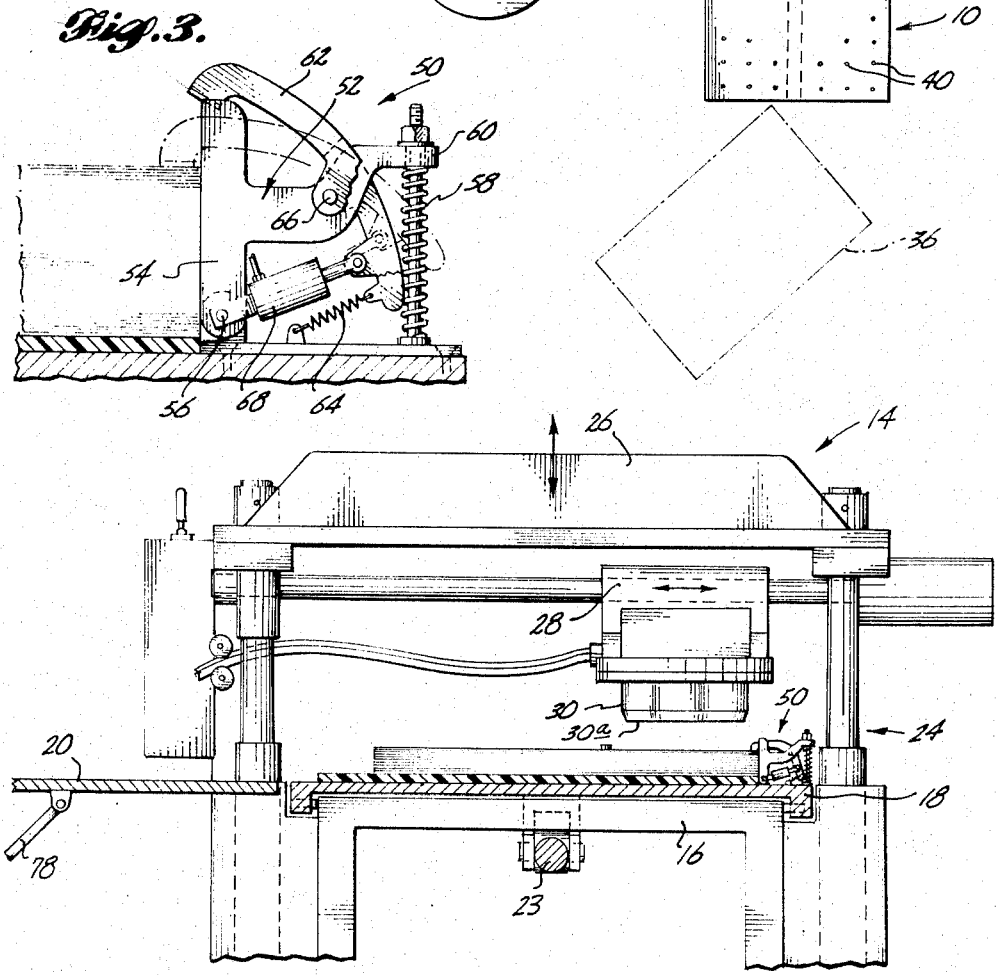
Fig.2.

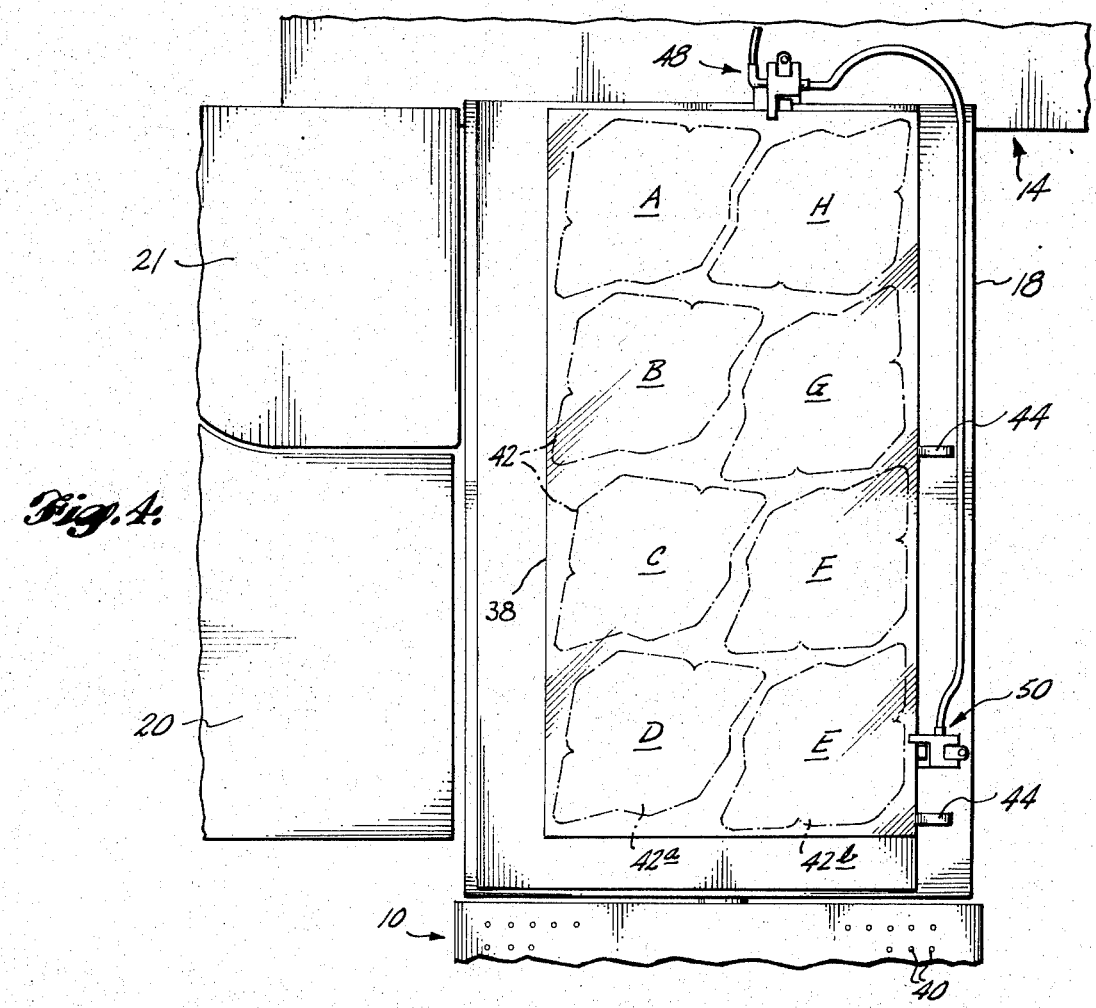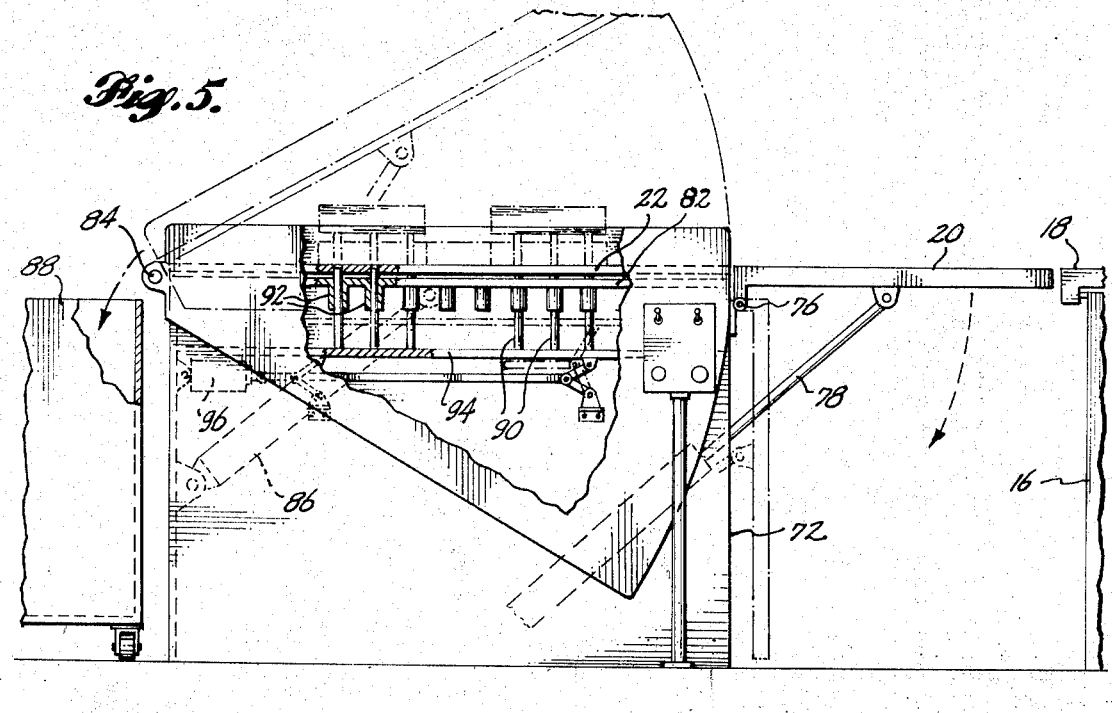

APPARATUS FOR CUTTING BLANKS

This invention relates to die cutting apparatus including a die press having a vertically movable cutting die which is forced downwardly through a sheet, usually a stack of sheets sometimes known as a "lift," to cut blanks therefrom. More particularly, aspects of the invention concern, in conjunction with such a die press, a novel organization of support, drop and ejector tables, permitting a significantly greater output to be realized on the machine than previously possible. Following the invention, it is possible substantially to reduce the man-handling of lifts, which can be a problem when the sheets in the lift have substantial size, and which is a factor in maintaining worker efficiency over a long period of time. The invention also concerns a novel method of processing a sheet, usually a lift of sheets, wherein maximum output may be realized.

As is known in the art, die presses have been proposed comprising a cutting die which is moved downwardly by press mechanism to be forced through product placed below it. In the process the die cuts out a blank having the configuration of the cutting edge in the die. Such have been used in the paper products industry, for the cutting of blanks which are then prepared into envelopes, packaging or other specialty items. Ordinarily, and when cutting blanks for envelopes, for instance, the cut is made through a stack of aligned paper sheets (a lift), whereby one cutting pass of the die produces a stack of blanks.

In the use of a die press, it is common to make a number of cutting passes referred to herein as cuts, on material fed to the die press. Successive cuts are made, with the cutting die repositioned over a new location of the material in the die press after each cut. This repositioning may be performed as by laterally moving a cutting table supporting the material, laterally moving the die to shift it so that it overlies a new region of the cutting table, or sometimes by a combination of such movements. These may or may not be accompanied by partial revolving of the die about an axis normal to the plane of its cutting edge, to obtain proper placement of the cutout pattern whereby minimal waste in the form of trim results.

In the utilization of such apparatus, difficulties have been encountered in properly handling the product being cut, which in the case of envelope manufacture is the lift of sheets, experienced both before, during and after the cutting operation. A die press is a relatively bulky piece of equipment and for optimum output to be obtained by a single operator, it is important that all the handling operations required, including the feeding of lifts to the machine, the aligning of sheets in the lift, and the removal of cut product, be capable of being performed from a location disposed on one side of the machine, and with minimal movements of the operator.

Of further importance in obtaining maximum output is the order in which cuts are produced through a lift, with relative displacement of the cutting table and the die occurring in steps as the cutting order progresses. In determining how successive cuts are to be made, factors to be considered are that a lift during the cutting of a stack of blanks is compressed and deformed immediately adjacent the region cut, requiring that somehow the lift be stabilized as the various cuts are made. Furthermore, as stacks of blanks are successively cut from a lift, more and more of the lift becomes trim, with the lift having increasingly less ability to withstand the distorting that results during the act of producing a cut.

One general object of the invention is to provide improved apparatus for cutting blanks from a sheet, including a vertically movable cutting die, featuring means complimenting a cutting table in the apparatus promoting the fast and efficient handling of product during the cutting operation.

Another object is to provide such apparatus that makes possible a flow of work both into and out of a station where the cutting is performed, by moving the work over defined paths provided therefor.

A further object is to provide such apparatus, featuring a novel organization of clamps in conjunction with relatively and incrementally movable cutting table and cutting die, accommodating an order of cuts in a stack of sheets which enables cutting to be initiated with minimal machine movements after the loading of a new stack, and which results in the cutting table at the completion of the cutting operation being in optimum condition for the receiving of a new stack.

The invention further features, in conjunction with a die press including a vertically movable cutting die, a novel organization of drop table and ejector table provided for the conveying of work away from the cutting table after the completion of making cuts through the work. A further feature of the invention is a novel form of ejector table, which is mounted for inclining movement away from a normally horizontal position, to promote gravity-induced sliding of material from off the table to clear it.

A further object of the invention is the provision of a novel method of cutting blanks from a sheet or a stack of sheets, with clamping and an order of cutting so related as to promote an efficient use of the die press.

Yet another object is to provide a novel method of cutting blanks from a stack of paper sheets and the like permitting supportive movement of the sheets both onto and off of a cutting table, in a manner conveniently handled by a single operator.

These and other objects and advantages of the invention will become more fully apparent as the following description which is read in conjunction with the accompanying drawings, wherein:

FIG. 1 is a top plan view illustrating, in somewhat simplified form, the apparatus contemplated including a die press having a cutting table, and a supporting table and an ejector table used for the flow of work processed by the die press;

FIG. 2 is a side elevation, on a somewhat larger scale, illustrating further details of the die press;

FIG. 3 is a drawing on an even larger scale illustrating a clamp such as may be utilized in the apparatus;

FIG. 4 illustrates in plan a cutting table in the die press, and showing how a lift of sheets is clamped onto the cutting table; and FIG. 5 illustrates in an elevation view a drop table and an ejector table which are provided in the handling of lifts after they are removed from the die press.

Referring now to the drawings, and first of all more particularly to FIG. 1, illustrated in the figure, in plan view and in somewhat simplified form, is apparatus constructed according to one preferred embodiment of the invention. In general terms, the apparatus includes what is referred to herein as a support or delivery table 10, and a die press 12 including a cutting station generally shown at 14, a deck 16 (obscured in FIG. 1 but shown in FIG. 2) interposed between support table 10 and the cutting station of the die press, and a cutting table 18 which is movably mounted over the deck of the die press which supports a lift or stack of sheets during the cutting operation. The apparatus further includes, and again referring to FIG. 1, a hinged drop table 20 which in FIG. 1 is disposed to the left of table 18 and an ejector table 22 aligned with and to the left of drop table 20.

Considering further details of the die press 12, this may take any one of a number of different forms. As earlier explained briefly, a common form of die press includes what is referred to herein as a cutting die which is forced downwardly in a cut through the lift or sheet stack to produce a stack of blanks. The lift, while being cut, is supported on the cutting table, and the cutting die is retracted upwardly upon completion of the cut. The cutting die and the cutting table are then relatively laterally adjusted in position to place an uncut region of the lift under the cutting die. In the particular form of die press shown in the drawings, cutting table 18 is advanced in steps or increments by operation of a conventional screw 23 to advance the leading end of the cutting table forwardly (or upwardly in FIG. 1) and through the cutting station, to produce one type of this relative adjustment. The table, of course, is likewise retractable in steps, to return the same to its retracted position as shown in FIG. 1.

Referring now also to FIG. 2, the die press includes a frame 24 including a crossbeam 26. Dependently supported under the crossbeam, on a carriage 28 which is movable in a transverse direction with respect to the path of movement of the cutting table, is the cutting die 30. Included in the mounting for the cutting die is mechanism actuatable to force the die downwardly and then to retract the die to complete a cut or cutting stroke for the die. The mounting for the die also includes means for revolving the die about an upright axis with the lower cutting edge of the die maintained in a horizontal plane. In this way, and by shifting of the carriage, the die can be shifted laterally of the direction of movement of the cutting table to place an uncut region of the lift under the die. The revolving movement provided for in the mounting for the stamping die is important as when cutting irregularly shaped patterns, since it enables closer placement of successive cuts with reduction of trim or waste. In FIG. 1, the directions of movement afforded the cutting die with respect to frame 24 is indicated by the double ended arrow 32, and the directions of movement afforded the cutting table is indicated by the double ended arrow 34.

Referring again to FIG. 1, the rectangular paper sheets which are to have blanks cut from them are obtained from a supply, which may be a suitable elevatable platform supporting a relatively high stack of sheets represented by the outline 36. The sheets, and in the making of paper envelopes, ordinarily comprise equisized paper sheets, stacked in a substantially aligned condition at the supply.

The capabilities of the usual die press are such that ordinarily a lift or stack of sheets of not more than about, for example, two inches thickness may be processed at any one time, although the exact thickness of such will vary depending upon such factors as the machine design, the type of paper, etc. During operation of the apparatus, an operator removes a lift from supply 36, and places such on the support or delivery table 10, to ready the same for the cutting of blanks. With the supply directly adjacent support table 10, it is a relatively easy matter for an operator to select the number of sheets desired in the lift, and to slide the lift off from the supply and onto the support table. The lift ordinarily is positioned on the support table by the operator with an axis thereof extending generally in the direction of the path of movement of cutting table 18.

As already indicated, by providing the support table a lift may be selected from the supply and placed in a state of readiness for processing in the die press. It is conventional for the screw which moves the cutting table to extend from frame 24 outwardly and into the region generally covered by the support table. Thus, the support table provides a convenient means for the transport of a lift from the supply or source to the cutting table.

Preferably the support or delivery table has a construction which facilitates the movement of a lift thereover when the same is to be transferred to the cutting table. In the preferred embodiment of the invention, the table comprises what is referred to as an air table, and includes multiple small openings 40 regularly distributed over the surface of the table and each communicating with a source of air under pressure. These openings may be provided with small spring biased balls forced upwardly by such biasing to have upper surfaces protruding above the plane of the table and in this position closing off the openings. The balls move downwardly under the weight of any lift placed thereover, to open up the openings, thus to permit the exhaust of air therefrom. Exhausted air from the various openings forms a film of supportive air under a lift, permitting the lift to be shifted with relatively little effort from the support table onto cutting table 18.

Illustrated in FIG. 4 is the top of a lift of sheets 38, and shown by dashed outlines at 42 is the distribution of stacks of blanks that typically might be cut from the lift. To obtain maximum production of blanks, and minimum trim or waste, it will be noted that the proposed regions for blank cutting are relatively closely spaced and the die used in the cutting must be rotated between different positions, illustrated, for instance, by comparing the outlines 42a and 42b. With the closely disposed nature of the proposed cuts, it is important that the sheets of the lift be closely aligned, and occupy a predetermined position on the cutting table, before the commencement of the cutting process. Furthermore, the lift must be clamped in some manner, since movement of the die downwardly through the stack of sheets causes distortion in immediately adjacent regions. An additional consideration is that as blanks are cut, dimensional stability is lost in the stack, dictating a special use of clamping pressures if properly cut out blanks are to be obtained.

Referring to FIGS. 1 and 4, shown at 44 are stops which are fastened to the cutting table and which have vertically disposed abutment faces used in positioning the lift on the cutting table. Shown at 48 and 50 are clamps which also have abutment faces (as will be described) whereby the clamps also perform a positioning function. The clamps additionally include hydraulically actuated clamp fingers which are brought down on top of the lift being processed to produce clamping engagement therewith.

In order to obtain a better understanding of the operation of a clamp, one will be briefly described, and reference is now also made to FIG. 3. The clamp 50 illustrated has a body 52 which includes a post 54. A side of this post, which faces the lift, functions as an abutment face in the clamp. The body of the clamp is pivotally mounted at 56 whereby the body is afforded limited pivotal movement about a horizontal axis adjacent the base of the body. Spring 58 interposed between rear extension 60 of the body and the mounting of the clamp, urges the body to a position where post 54 has a vertical side facing the lift, such spring yieldably accommodating movement of the body whereby the post 54 shifts in a clockwise direction in FIG. 3.

Pivotally mounted at 66 on the body of the clamp is a clamp finger 62. A spring 64 connected to the clamp finger tends to urge the same in a clockwise direction about pivot 66. A fluid-operated cylinder 68 having a rod extending to and connected to the finger is extensible to shift the finger in a counterclockwise direction in FIG. 3, to place the finger in the position shown in dashed outline in the figure where it exerts clamping pressure on a lift.

A lift of sheets is positioned against the clamp with an edge of the lift indexed by post 54. To clamp a margin of the lift, the cylinder is actuated to swing the upper end of the clamp finger downwardly whereby it moves over and against the top of the lift. During cutting, there is some lateral outward displacement of the sheets in the lift, which is accommodated by the swinging movement afforded the post, as has been described.

It will be noted, and with reference again to FIG. 1, that the stops and clamps are placed for engagement with the edge of the lift at the lead end of the lift as such is moved onto the cutting table, and also for engagement with the edge of the side margin of the lift which is opposite the side where the operator positions himself, which is to the left of the cutting table in FIG. 1. In this way, these devices offer no obstruction to the sliding movement of a lift onto the cutting table from the delivery table 10. Furthermore, an operator positioned as indicated is easily enabled to tamp the edges of the lift to produce absolute alignment of all sheets as determined by the stops and clamps.

At the completion of the cutting process on a given lift, the cut lift (blanks and trim) is removed from the cutting table by moving it transversely of the path of movement of the cutting table, or to the left in FIG. 1. The lift is pulled off with sliding movement, and also usually turned at right angles if the lift has an elongate outline, to place it on ejector table 22. Drop table 20 during this movement of the lift has a raised, horizontal position, where it occupies substantially the plane of the cutting table and the ejector table, and provides a conveying surface facilitating the movement of the lift, including cut blanks, onto the ejector table. A shelf 21, which normally may have a fixed horizontal position, forms a continuation of the drop table with the drop table raised.

The ejector table, and referring now to FIGS. 1 and 5, includes framework 72 which, through a hinge means 76, supports one side of drop table 20. Shown at 78 are portions of motor means, such as a fluid-operated ram, extending between the framework of the ejector table and the drop table. The ram is extensible to raise the drop table from its dropped or lowered position to place it in the horizontal position shown in solid outline in FIG. 5.

By providing the drop table shown, the region or zone occupied by the table when raised is opened up to enable the operator of the machine to occupy such zone when loading the cutting table and otherwise handling the lift on the cutting table. During removal of cut product, the operator positions himself more nearly to the supply of sheets 36, the zone of the drop table then being used for the transfer of sheets from the cutting table to the ejector table.

A lift with blanks cut out of it, after being positioned on the ejector table, has the stacks of blanks removed therefrom manually by the operator, and placed on an elevator 80 (see FIG. 1) where the cut blanks are stored. To displace the blanks from the waste or trim, vertically movable lifters are included (to be described) which come up under the blanks to lift them from the plane of the trim, whereby the stacks are more easily manipulated.

Considering specifics of the construction of the ejector table, and referring to FIG. 5, framework 72 includes a fixed horizontal plate 82. Ejector table 22 itself is hinged to the framework by hinge means 84, and supported in a horizontal position by underlying plate 82. A fluid-operated ram 86 connected to the ejector table and with its opposite end mounted on the framework 72 is extensible to raise the right margin of the ejector table in FIG. 5, with the table swinging about the horizontal axis provided by hinge 84 to reach the inclined position shown in dashed outline in FIG. 5. With the table in its raised inclined position, waste or trim, is induced by gravity to slide off the ejector table and into a trash collecting waste bin shown at 88.

Describing the lifters or lift means earlier mentioned, a plurality of pegs 90 are loosely and slidably received within sleeves 92 secured to plate 82. The plate is apertured above the sleeves in regions forming continuations of the interiors of the sleeves. A riser frame shown at 94 is mounted for vertical reciprocation in framework 72, and moved by actuation of a ram 96. The riser frame supports the bottom ends of the pegs. The ejector table is apertured in regions which register with the apertures in plate 82 and the sleeves 92 with the ejector plate in its lowered, horizontal position.

With the ejector plate lowered, pegs 90 may be shifted upwardly to move through the apertures in the ejector plate to a raised position, where they project above the plane of the ejector plate. Such upward movement is produced by actuation of ram 96 to elevate the riser frame 94. With a peg elevated above the plane of the ejector table, such will operate to lift any stack of cut blanks positioned over the peg, to enable an operator more easily to grab hold of the stack and remove it.

By providing the removable pegs disclosed, the regions where a lifting action is desired is readily changed to accommodate any particular pattern of cut blanks produced in a lift. Of course, in regions where no pegs are provided, no lifting action occurs on rising of the riser frame. It will be further noted that upward inclining movement of the ejector table is accompanied without displacement of the pegs and the mechanism provided for raising and lowering these pegs.

Generally describing how the apparatus is utilized, and how the method of the invention may be practiced, a lift of aligned paper sheets is removed from the supply and placed on delivery table 10, with the lift oriented so that an axis thereof extends in the direction of the path of movement of the cutting table. The operator, with the drop table lowered to free the zone of the table, and facilitated by operation of the air system provided table 10, positions the lift on the cutting table, with the edge bounding the lead end of the lift against clamp 48. With a tamping tool the sheets in the lift are exactly aligned and the lift exactly positioned against the stops and clamp on the side of the cutting table.

As can be seen with reference to FIG. 4, with the pattern of blanks pictured, eight stacks of blanks are to be cut from the lift, with eight cutting passes performed along two rows, with one row extending along one side margin of the lift and the other row extending along the other side margin.

To minimize machine movements, optimumly cutting should be initiated adjacent the lead end of the lift, as such is directly adjacent the cutting station and most easily positioned in proper position for the first cut. Further, optimumly the last stack of blanks cut from the lift should be adjacent the lead end of the stack, as this places the cutting table with its trailing end close to delivery table 10 and in readiness to receive a new lift.

The cutting of stacks of blanks in this manner may be carried out satisfactorily only if the lift is clamped at locations adjacent both the lead and the trailing end of the lift, since otherwise the sheets at the end which is unclamped would tend to displace, to produce improperly cut blanks. It is further important that any clamping of a region of the lift be released at such time as a stack of blanks is cut immediately adjacent such region.

According to the method of the invention, it is proposed that blanks be cut from the lift using a first cutting sequence where successive stacks of blanks are cut with such extending in a row along the side margin at the left in FIG. 4, which is opposite the side margin clamped by clamps 48, 50. In this first sequence of cuts, as shown in FIG. 4, four different cuts would be made, in regions indicated at A, B, C and D, with the cutting being in that order. Clamping pressure is maintained by both clamps 48 and 50 until the completion of cut in region D, whereby during such first sequence of cuts, both leading and trailing ends of the lift are maintained clamped. While trim is produced during this sequence of cuts along the left margin of the lift in FIG. 4, such does not introduce displacement problems, because the right margin is imperforate during this sequence and the sheets are maintained in proper aligned position by the clamps noted.

At the completion of the first series of cuts, a second sequence of series of cuts is performed, in regions E, F, G, and H, extending along the right margin of the lift in FIG. 4, or along that margin which formerly had been clamped both at leading and trailing ends. The progression of the cuts in the second sequence of cuts extends from the trailing to the lead end of the lift, and thus is accomplished by incremental or stepwise shifting of the cutting table in to its retracted position (to ready it for a new lift of sheets). Before the cut indicated at E is performed, clamp 50 is released, to enable blanks in the region E to be properly formed. However, clamp 48 remains engaged to exert a clamping pressure at the lead end of the lift during the initial part of this second sequence of cuts. The sheets are maintained in proper alignment because cuts are made progressively in an expanse of the lift extending toward clamp 48 which is whole and without cuts.

After the cut in region G is performed, and before the final cut at H, clamp 48 is released. During the making of the last cut, the lift is free of any clamping pressure applied thereto, other than as a result of the die working through the lift.

Using the order of cutting described, upon completion of the cutting process, the cutting table is retracted, and the cut lift is positioned adjacent the zone occupied by the drop table with the latter elevated. To facilitate removal of the lift, the drop table is elevated, an the cut lift is moved onto the ejector table, with the lift now oriented so that it extends transversely of the path of the cutting table. The ejector table is lowered and horizontal when receiving the lift, and during operation of the lifters and removal of the stacks of cut blanks. After removal of the blanks, the lifters are lowered, the ejector table is inclined, and the remaining trim falls into the waste bin indicated.

Utilizing the apparatus described, and performing the method contemplated, the time required by the die press to produce the different cuts may be utilized by the operator in the preparing of a new lift for the cutting table by removing such from the supply and depositing such on the delivery table. The operator may also remove the cut blanks from the trim on the ejector table, and dispense with the trim into the waste bin. With the cutting table retracted to its position adjacent the delivery table, the just-cut lift is removed, and a new lift then substituted, enabling the die press to be actuated in a new series of cuts.

We claim:

1. Apparatus for cutting blanks from a sheet comprising
    a die press, including a vertically movable cutting die which is forced downwardly to cut a blank,
    a horizontally disposed cutting table positioned below said die, said cutting table and die being relatively movable in increments along a horizontal path to place a sheet supported on the cutting table at different positions under the die,
    a horizontal support table for holding a sheet in readiness for cutting aligned along said path with the cutting table and located directly adjacent an end of the cutting table, and
    a hinged drop table located to one side of the cutting table having a raised position where the drop table forms a horizontal extension of the cutting table in a zone extending transversely of said path, said drop table having a lowered position to open said zone for an operator positioned adjacent the cutting table.

2. The apparatus of claim 1, wherein the drop table is hinged to drop from a horizontal to a lowered vertical position, and power-operated means is provided for operating the drop table.

3. The apparatus of claim 2, which further includes an ejector table having a position aligned with said drop table in a direction extending transversely of said path, said ejector table having a horizontal position and being mounted for inclining movement to incline the table from its horizontal position thus to promote gravity-induced sliding of material off the ejector table.

4. The apparatus of claim 3, which further comprises power-operated means for inclining the ejector table and holding the same in its inclined position.

5. The apparatus of claim 1, which further includes an ejector table aligned with said drop table in a direction extending transversely of said path, said ejector table having a horizontal position and being mounted for inclining movement to incline the table thus to promote gravity-induced sliding of material off the table, and vertically shiftable lifter means registering with apertures in said ejector table when the latter is in its said horizontal position, said shifter means being movable upwardly through said apertures to displace material on the ejector table.

6. The apparatus of claim 1, which further comprises first and second clamps mounted on said cutting table positioned to engage a side margin of a sheet with such side margin positioned parallel to said path and adjacent the side of the cutting table opposite its said one side, one of said clamps being adjacent said end of the cutting table and remote from the other clamp which is adjacent the opposite end of the cutting table.

* * * * *